United States Patent

[11] 3,621,354

| [72] | Inventors | James W. Fawcett<br>E. Syracuse;<br>John M. Irwin, Clay; Robert J. McFadyen,<br>Syracuse, all of N.Y. |
|---|---|---|
| [21] | Appl. No. | 1,233 |
| [22] | Filed | Jan. 7, 1970 |
| [45] | Patented | Nov. 16, 1971 |
| [73] | Assignee | General Electric Company |

[54] DC MOTOR CURRENT ACTUATED DIGITAL CONTROL SYSTEM
8 Claims, 6 Drawing Figs.

[52] U.S. Cl. .................................... 318/341,
318/395, 318/618
[51] Int. Cl. .................................... G05b 5/01
[50] Field of Search ........................... 318/327,
601, 603, 341, 395, 248, 618; 307/52, 53

[56] References Cited
UNITED STATES PATENTS
| 3,293,522 | 12/1966 | Lewis ............................ | 318/327 |
| 3,376,486 | 4/1968 | Caputo .......................... | 318/327 X |
| 3,495,775 | 2/1970 | Camillo ......................... | 318/162 X |

Primary Examiner—Benjamin Dobeck
Attorneys—Marvin A. Goldenberg, Richard V. Lang, Frank L. Neuhauser, Oscar B. Waddell and Joseph B. Forman ABSTRACT: Wideband digital servosystem for accurately controlling the velocity and/or position of a DC motor. A plurality of constant current sources connected in the armature circuit are actuated in response to a sensed digital error, determined by subtracting from a digital input a number of pulses proportional to the motor rotation.

PATENTED NOV 16 1971 3,621,354
SHEET 1 OF 3
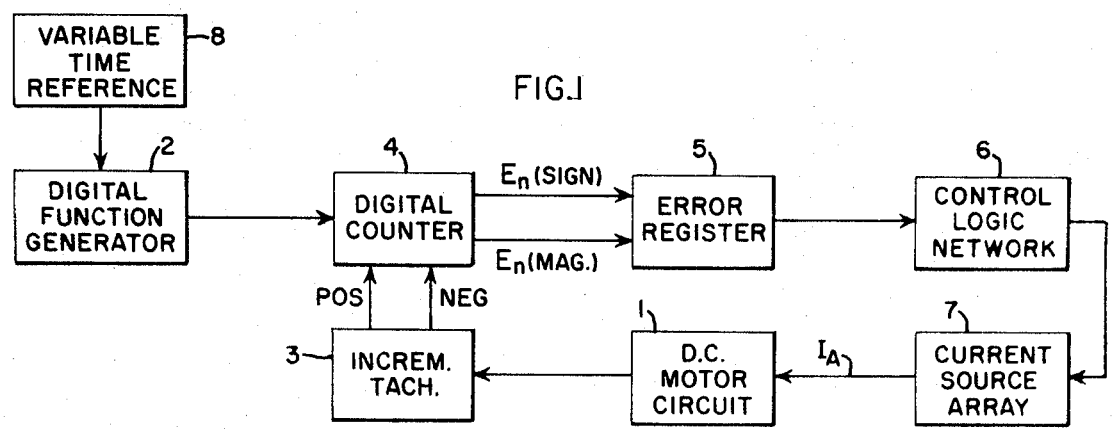
FIG.1
FIG.2
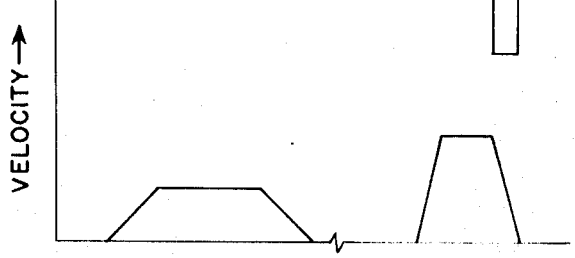
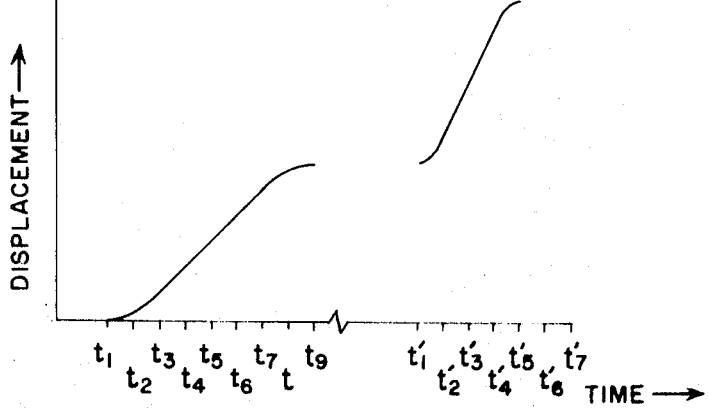
INVENTORS:
JAMES W. FAWCETT,
JOHN M. IRWIN,
ROBERT J. McFADYEN,
BY *Marvin L. Feldenberg*
THEIR ATTORNEY.

INVENTORS:
JAMES W. FAWCETT,
JOHN M. IRWIN,
ROBERT J. McFADYEN,

BY *Marvin L. Goldenberg*
THEIR ATTORNEY.

INVENTORS:
JAMES W. FAWCETT,
JOHN M. IRWIN,
ROBERT J. McFADYEN,
BY *Marvin L. Freidenberg*
THEIR ATTORNEY.

DC MOTOR CURRENT ACTUATED DIGITAL CONTROL SYSTEM

BACKGROUND OF THE INVENTION

1. Field of the Invention

The invention relates to the field of DC motor control systems and, more specifically, to digital servocontrol systems.

2. Description of the Prior Art

One well known technique for DC motor digital control is to employ digital components in a servo loop for sensing motor velocity error, converting the error signal to an analog equivalent with a D-A converter prior to amplification and applying the amplified analog signal to the motor armature. The power bandwidth product of control systems of this type is limited. Further, the power amplifiers are inclined to fail should a single-power transistor component burn out, the failure of one component placing such additional load on the remaining components that they too burn out.

In another approach to digital control of DC motors, motor error is sensed in a digital manner and used to selectively apply different voltages to the motor armature. In addition to the above-noted limitations, these systems are not well suited for controlling motor acceleration, which is a direct function of armature current. Further, an appreciable amount of equipment and circuitry may be required.

BRIEF SUMMARY OF THE INVENTION

It is accordingly an object of the invention to provide a novel DC motor digital control system that is current actuated and does not employ linear power amplification.

It is a further object of the invention to provide a novel DC motor digital control system of improved power bandwidth properties.

It is another object of the invention to provide a motor control system of the above-recited characteristics which is of a relatively simple and inexpensive construction.

It is yet another object of the invention to provide a motor control system as described which imparts an accurate control of applied torque and acceleration.

Still another object of the invention is to provide a motor control system of the described type which has the ability to change the system drive characteristics on command, during operation.

In accordance with these and other objects of the invention there is provided a current-actuated digital control system by means of which the rotation of a DC motor, which may be in terms of velocity or position, is caused to track a predetermined rotational profile. The system basically includes a comparator means responsive to a first reference input that is in accordance with a predetermined rotational profile and a second variable input corresponding to actual motor rotation, for generating an error signal that is a function of the difference between said first and second inputs. Said first input is generated by a digital function generator and said second input is generated by a pulse generator coupled to the output of said motor. There is further provided digital logic circuitry and an array of constant current sources for supplying armature current to said motor. Means responsive to said error signal adjusts the logic states of said logic circuitry for actuating said current source array so as to supply current to said motor in accordance with said error signal.

In accordance with a further aspect of the invention, a variable time reference means is provided for adjusting said rotational profile.

For a velocity control the feedback control loop operates synchronously. Said first reference input comprises a succession of binary-encoded numbers corresponding to a predetermined velocity profile, and said second variable input comprises a train of pulses of periodicity corresponding to actual motor velocity. Said comparator means is in the form of a digital counter and has said binary-coded numbers individually entered therein during a succession of sample periods. Said train of pulses are applied for causing said counter to count and thereby generate a digital error signal each sample period. A buffer means in the form of an error register receives said digital error signal and applies it to said digital logic circuitry.

For a position control the feedback control loop operates asynchronously. Said reference input comprises a train of pulses occurring at computed points in time representing a position profile, which pulses are applied to the digital counter to produce counting in a given direction. The pulses of said second input, representing motor position, produce counting in a direction opposite to said given direction. An error signal occurring for each computed pulse is applied directly to said digital logic circuitry.

BRIEF DESCRIPTION OF THE DRAWING

The specification concludes with claims particularly pointing out and distinctly claiming the subject matter which is regarded as the invention. It is believed, however, that both as to its organization and method of operation, together with further objects and advantages thereof, the invention may be best understood from the description of the preferred embodiments, taken in connection with the accompanying drawings in which:

FIG. 1 is a general block diagram of DC motor current-actuated digital control system in accordance with the invention for providing a velocity control;

FIG. 2 is a series of graphs illustrating acceleration, velocity and displacement versus time for an exemplary motor operation;

With reference to FIG. 1, there is illustrated a general block diagram of a DC motor current-actuated digital control system, in accordance with one embodiment of the invention. A DC motor 1 connected in a feedback loop is controlled to follow a given velocity, supplied by a digital function generator 2, which may take the form of a small special purpose computer. The digital function generator 2 is preprogrammed to compute, for example, a desired velocity profile and to supply a sequence of binary-encoded numbers corresponding to said velocity profile. The motor 1 can be employed for numerous drive functions. In the operable embodiment to be considered, the motor was a G.E. hyperservomotor employed to drive a paper feed mechanism of a high-speed duplicator and, accordingly, the velocity profile was computed to satisfy the requirements of this mechanism. A peak power of about 1 KW for a bandwidth of 1–2 kHz, was achieved. Although in the following discussion of FIG. 1 and related figures velocity control is specifically considered, it should be recognized that similar principles apply with respect to position control.

Figure 3:
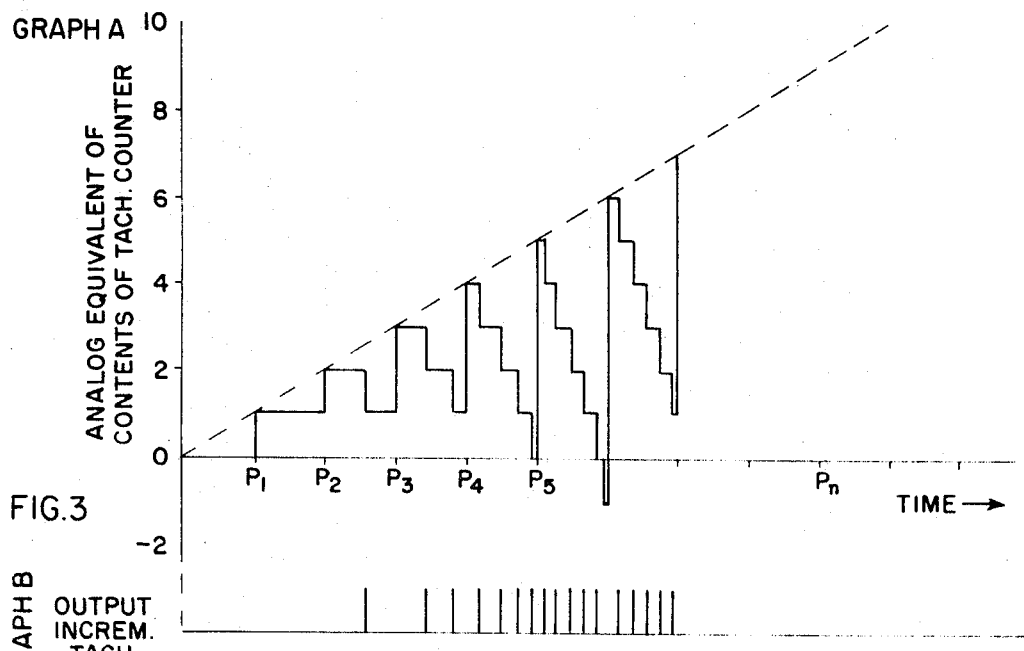
FIG. 3 represents two graphs illustrating the error-sensing process.

An incremental tachometer 3, which may be a conventional optical device, generates a digital signal corresponding to the motor rotation. The digital signal is in the form of a pulse train, a pulse occurring each time the motor shaft is incremented a specified distance. For a given sample period, the number of pulses generated may be appreciated to provide a measure of the motor shaft velocity. A positive and negative output is provided in accordance with the direction of shaft rotation. A binary-encoded number from digital function generator 2, corresponding to a desired number of pulses from tachometer 3 for a single sample period, i.e., a given velocity desired of the motor 1, is entered into a digital counter 4 at the beginning of each sample period. The digital counter may be a standard component comprising several binary stages with control logic for performing a digital-counting operation, plus a sign stage for indicating the polarity of the number being counted. The positive output digital signal generated by the tachometer 3 is applied to the count down input of counter 4 and as each pulse occurs the counter is decreased by a count of one. Correspondingly, the negative output of tachometer 3 is applied to the count up input of counter 4 and will cause the counter to be increased by one for each pulse. In the present discussion only positive outputs are considered to be present. At the end of the sample period, which may be determined by an external time reference applied to the digital function generator 2 from a variable time reference source 8, the magnitude and sign of the residual count in the counter 4 are entered into an error register 5 and stored there for the succeeding sample period. The register 5 is also typically a standard component, comprising several binary stages for receiving and reading out binary information either in a serial or parallel sequence. The latter operation will be assumed.

The residual count represents the velocity error $E_n$ of the motor for a given sample period. The velocity error $E_n$ is defined as:

$$E_n = \frac{\Delta \theta_n}{T} - \frac{\Delta \phi_n}{T} \qquad (1)$$

where  $n$ = the number of the sample period
$T$ = the sample time duration
$\Delta \theta_n$ = the desired motor shaft angle increment for the $n$th sample period $\Delta \Phi_n$ = the actual motor shaft angle increment for the $n$th sample period As has been seen, the desired and actual velocities $\Delta \theta_n/T$ and $\Delta \Phi_n/T$ are processed in binary-encoded form, and the velocity error $E_n$ is expressed as a digital number.

The error register is connected to a control logic network 6 which, as will be described in greater detail when considering FIG. 4, includes several logic gates. The control logic network 6 is connected to a current source array 7 which includes several discrete current sources, also to be more explicitly described with respect to FIG. 4. The output from register 5 selectively enables the logic components of network 6, which in turn selectively actuate the current source components of array 7 for supplying armature current $I_a$ to the motor 1 in accordance with the digital error stored in register 5. It is noted that the register 5 acts as a buffer between the counter 4 and the current source array 7.

Considering an exemplary operation of the system of FIG. 1, reference will be made to the Graphs A, B and C of FIG. 2 which illustrate acceleration, velocity and displacement versus time characteristics, respectively, required of the motor 1 in performing designated drive sequences. It is seen that in a first series of sequences between times $t_1$ and $t_9$ there is a constant acceleration between $t_1$ and $t_3$; a constant velocity between $t_3$ and $t_7$; and a constant deceleration between $t_7$ and $t_9$. The second series of sequences between $t'_1$ and $t'_5$ is of the same form as the first, constant acceleration, velocity and deceleration, but the sequences are contracted on the time scale so that the displacement is equal but performed in a fraction of the time.

In order to operate the motor to follow the constant acceleration ramp of Graph B between $t_1$ and $t_3$, a suitable binary-encoded input is entered into the digital counter 4 from the function generator 2 at the beginning of the first sample period. In Graph A of FIG. 3 there is plotted the analog equivalent of the counter 4 contents versus time for a succession of sample periods. The maximum values in each sample shown are computed numbers to coincide with the desired constant acceleration ramp. Accordingly, it is seen that at $p_1$, the beginning of the first sample period, a count of 1 is fed into the counter 4. During this sample period it is assumed that there is a 0 error signal at the output of digital counter 4 and that the velocity of the motor 1 is zero so that no output is provided by the incremental tachometer 3. The count in the counter 4 therefore remains unchanged during the first sample period. At $p_2$, the beginning of the second sample period, readout of the stored count and read in of a subsequent binary-encoded number occur in rapid succession. Thus, in response to a read out signal from the digital function generator 2 the stored count of 1, which represents the error $E_n$ of the first sample period, is dumped into the error register 5, and in response to a read in signal the binary-encoded number 2 is entered into the digital counter 4. During the second sample period, the current source 7 is actuated by the control logic network 6 to rotate the DC motor 1 at a velocity in accordance with the applied error signal. This velocity corresponds to a single pulse being generated from the incremental tachometer 3, shown in Graph B of FIG. 3, for decreasing the count in the counter 4 by a single count. At $p_3$, the beginning of the third sample period, in response to successive read out and read in signals, a stored error of 1 is fed into the error register 5 and the next input binary-encoded number of 3 is entered into the counter 4. It is noted that the error $E_n$ is the same for the second sample period as for the first. Thus, the current source array continues to supply current to the motor 1 for increasing its velocity. In this regard, it is noted that armature current $I_a$ is proportional to motor torque and acceleration. During the third sample period, the tachometer 3 generates two pulses, shown in Graph B of FIG. 3, for counting down the counter 4 again to an error of 1 at the end of the period. The process continues with binary numbers of increasing value being entered into the counter 4 at the beginning of the succeeding sample periods. Correspondingly, the DC motor 1 is increasing its velocity and providing pulses from the incremental tachometer 3 which closely track the input binary-encoded numbers. It is noted that at $p_5$ the error $E_n$ is reduced to 0 and at $p_6$ is $-1$, indicating that the motor velocity has exceeded the programmed velocity. For this condition a negative error is entered into the register 5 for reducing the motor velocity. This is accomplished by reversing the armature current through the motor, which will be seen more clearly when considering FIG. 4.

In the example under consideration, the sample periods may be assumed to have a duration of 1 millisecond, which corresponds to the duration employed in one operable embodiment of the invention. For changing the motor drive operation by either contraction or expansion on the time scale, it becomes only necessary to adjust the sample period duration. For example, for contracting the operation time by a factor of 2, such as shown in the second series of sequences in FIG. 2, the sample period is halved to ½ millisecond. It sometimes becomes necessary to adjust the motor drive operation in synchronism with variations in the external time reference. This is common where the external time reference source 8 may include another motor drive mechanism in the system, with the sample period being determined from the velocity of this reference motor. In such operation the reference motor generates pulse as a function of its velocity, which pulses are fed to a counter. The sample period is set equal to the time for counting a predetermined number of pulses. It may be appreciated that as the velocity of the reference motor increases, less time is required for counting such predetermined number of pulses and the sample period is correspondingly reduced. Similarly, as the reference motor velocity decreases, more time is required for counting such predetermined number of pulses and the sample period is lengthened.

Figure 4:
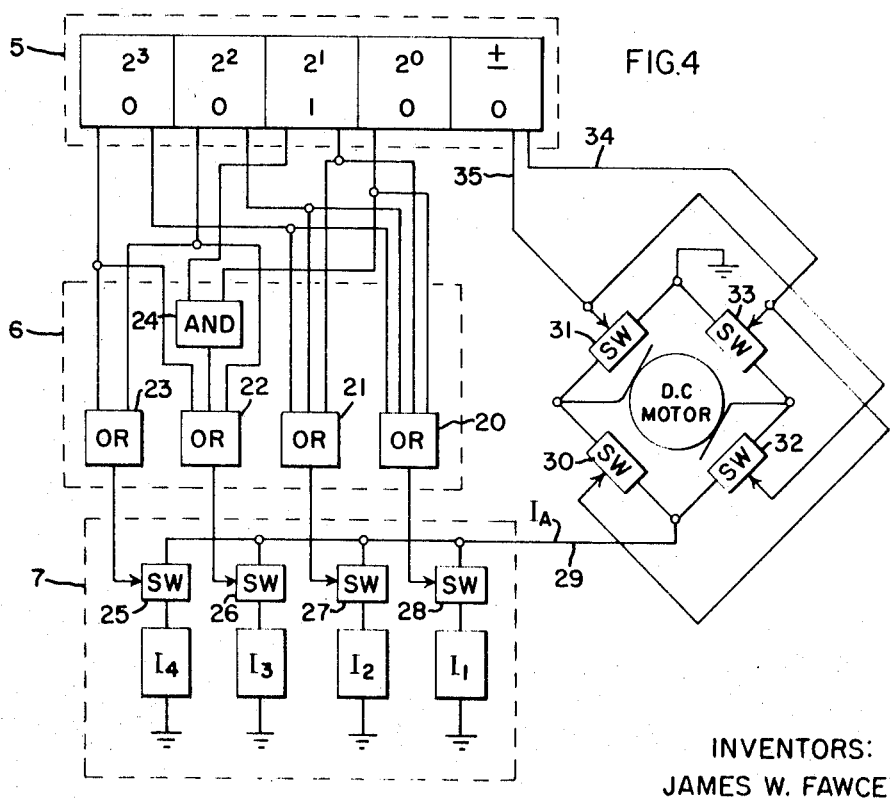
FIG. 4 is a more detailed block diagram of the actuator components of the control system of FIG. 1.

In FIG. 4 there is a more detailed block diagram of the actuator components of the system of FIG. 1, including the error register 5, the control logic network 6, the current source array 7 and the DC motor circuit 1. The error register comprises four binary number flip-flop stages $2^0$, $2^1$, $2^2$ and $2^3$, and a sign flip-flop stage, the error signal $E_n$ from the counter 4 being stored in binary form with its appropriate sign. The flip-flop stages $2^0$ through $2^3$, normally with true and complementary outputs, have only a single output, e.g., the true output, selectively connected to AND-and OR gates of network 6 for performing a prescribed logic operation. Network 6 includes OR-gates 20, 21, 22 and 23, and AND-gate 24. The output from flip-flop stage $2^0$ is connected to OR-gates 20 and 21 and AND-gate 24; the outputs from stages $2^2$ and $2^3$ are each connected to OR gates 20, 21, 22 and 23.

Current source array 7 includes four discrete current sources $I_1$, $I_2$, $I_3$ and $I_4$, which may each be standard components. In addition, there are serially connected switches 25, 26, 27 and 28, which may be semiconductor devices, such as transistor or SCR components. These current sources are connected in parallel between ground and a common line 29 connected to the motor through a bridge circuit including switches 30, 31, 32 and 33, which may be transistor or SCR components. The current sources $I_1$ through $I_4$ are selectively actuated through their associated switches 25 through 28 by the logic network 6 to feed the armature current $I_a$ to motor 1 for obtaining a direct control of motor torque and acceleration. Specifically, the outputs from OR-gates 20, 21, 22 and 23 actuate, respectively, current sources $I_1$, $I_2$, $I_3$ and $I_4$, the control being thereby constructed to implement the following logic equations:

$$I_1 = 2^0 + 2^1 + 2^2 + 2^3 \quad (2)$$
$$I_2 = 2^1 + 2^2 + 2^3 \quad (3)$$
$$I_3 = (2^1 \cdot 2^0) + 2^2 + 2^3 \quad (4)$$
$$I_4 = 2^2 + 2^3 \quad (5)$$

From the above relationships the following table is derived which indicates the actuated current sources for integers 1 to 5 of the error signal $E_n$.

| $E_n$(Integer) | $E_n$(Binary) | $I_1$ | $I_2$ | $I_3$ | $I_4$ |
|---|---|---|---|---|---|
| 1 | 0001 | 1 | 0 | 0 | 0 |
| 2 | 0010 | 1 | 1 | 0 | 0 |
| 3 | 0011 | 1 | 1 | 1 | 0 |
| 4 | 0100 | 1 | 1 | 1 | 1 |
| 5 | 0101 | 1 | 1 | 1 | 1 |

In one operating embodiment under consideration the current source magnitudes were as follows:

$$I_1 = 2 \text{ amperes} \quad (6)$$
$$I_2 = I_3 = 10 \text{ amperes} \quad (7)$$
$$I_4 = 20 \text{ amperes} \quad (8)$$

Figure 5:
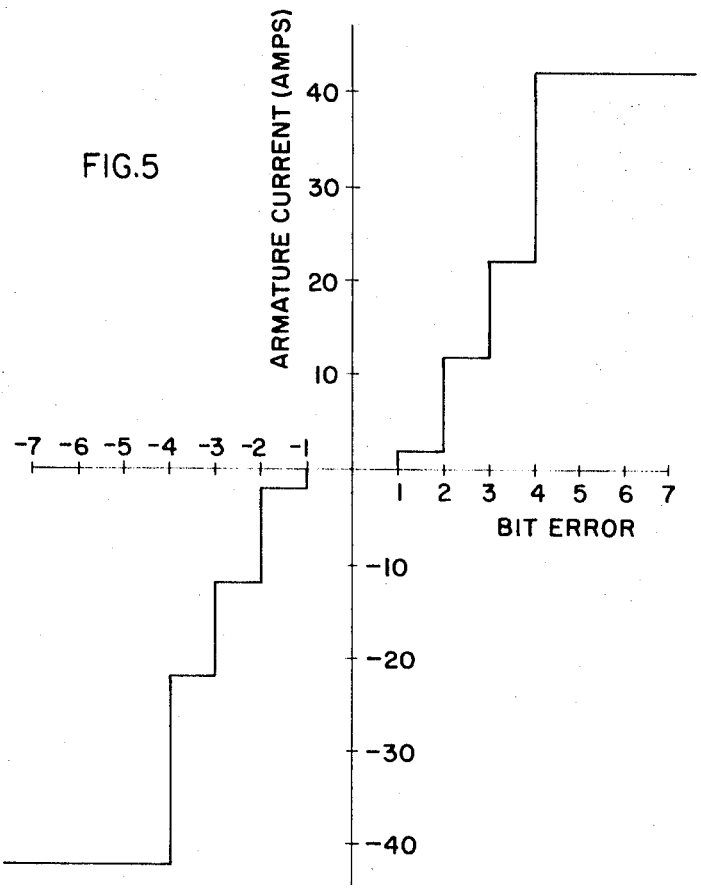
FIG. 5 is a graph of the bit error versus current transfer characteristics.

In FIG. 5 is a graph of the digital error versus armature current transfer characteristic, which is a graphic portrayal of the a above table with current values as given in equations (6), (7) and (8). Both positive and negative digital errors are illustrated. Armature current $I_a$ is conducted through the motor 1 in opposing directions in accordance with the sign of the digital error by means of the bridge switches 30, 31, 32 and 33. Switches 30 and 31 in two legs of the bridge are connected in series between line 29 and ground. Switches 32 and 33 in two other legs of the bridge are also connected in series between line 29 and ground, the armature of the motor being connected between the junction of switches 30 and 31 and the junction of switches 32 and 33. Switches 30 and 33 are operated in unison, and switches 31 and 32 are operated in unison, one pair being open when the other is closed. The switches may be operated by outputs from the sign stage of register 5, where the sign of the digital error is stored. Both true and complementary outputs 34 and 35 are obtained from the sign stage. The output 34, which may be assumed to generate an actuating signal for positive digital errors, is applied to close switches 30 and 33. The output 35, generating a signal for negative digital errors, is applied to close switches 31 and 32.

It may be appreciated that the transfer characteristic between the digital error in the error register 5 and the motor response can be readily modified by changing the current magnitudes of current sources $I_1$ to $I_4$ or the implemented control logic.

Figure 6:
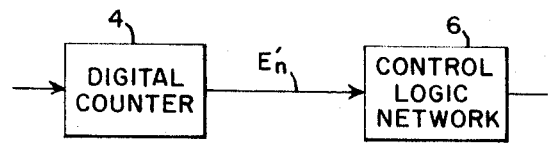
FIG. 6 is a modification of FIG. 1 for providing position control.

To perform a control of the motor 1 with respect to position, the structure and operation of the system may be similar to that described. The control loop, however, operates asynchronously in that there is no defined sample period as previously considered. Thus, the function generator 2 may generate input information in the form of pulses occurring at computed points in time representing a position profile, which pulses are applied to the digital counter 4 to produce counting in a given direction. The pulses from the tachometer 3, representing motor shaft position, produce counting in a direction opposite to said given direction. An error signal $E_n$, occurs for each computed pulse, which may be applied directly to the control logic network 6, as shown in the modification of FIG. 6. The network 6 actuates the current source array 7 to control the motor 1 in accordance with the error signal for providing a position control.

What we claim as new and desire to secure by Letters Patent of the United States is:

1. A control system for controlling a DC motor comprising:
   a. a DC motor,
   b. comparator means responsive to a first reference input that is in accordance with a predetermined rotational profile and a second variable input corresponding to actual motor rotation, for generating an error signal that is a function of the difference between said first and second inputs,
   c. digital logic circuitry,
   d. error means responsive to said error signal for adjusting the logic states of said logic circuitry,
   e. a current source connected to said DC motor for controlling the torque thereof in proportion to the current from said current source, and
   f. means for controlling the current from said current source in accordance with the logic states of said logic circuitry so as to correspondingly control motor rotation.

2. A control system as in claim 1 wherein said current source includes a plurality of constant current sources of discrete value coupled in parallel.

3. A control system as in claim 2 wherein said comparator means is a digital counter generating a digital error signal of positive or negative sign.

4. A control system as in claim 2 which includes a digital function generator for generating said first input in a digital form, and a pulse generator coupled to the output of said motor for generating said second input as a train of pulses.

5. A control system as in claim 4 wherein said logic circuitry comprises a plurality of AND- and OR gates selectively connected to actuate said constant current sources.

6. A control system as in claim 5 wherein said motor is connected in a bridge configuration so as to accommodate connection of said constant current sources to said armature in either of two directions in accordance with the sign of said digital error signal.

7. A control system as in claim 6 which includes variable time reference means for adjusting said rotational profile.

8. A control system as in claim 7 in which said first input is in the form of a succession of binary-encoded numbers representing a velocity profile individually entered into said counter during a succession of sample periods, and said train of pulses of said second signal representing actual motor velocity cause said counter to count and thereby generate said digital error signal each sample period, wherein said error means comprises a digital register for storing for at least one sample period the magnitude and sign of said error signal.

* * * * *